Feb. 24, 1970   C. A. MATTSON   3,496,706
ELECTRIC ROTARY LAWNMOWER AND GRASS COLLECTION BAG
Filed July 12, 1967

Inventor:
Charles A. Mattson
By
Robert W. Dudley
Atty

United States Patent Office 3,496,706
Patented Feb. 24, 1970

3,496,706
ELECTRIC ROTARY LAWNMOWER AND GRASS COLLECTION BAG
Charles A. Mattson, Oak Park, Ill., assignor to Sunbeam Corporation, Chicago, Ill., a corporation of Illinois
Filed July 12, 1967, Ser. No. 652,931
Int. Cl. A01d 35/26
U.S. Cl. 56—25.4        11 Claims

ABSTRACT OF THE DISCLOSURE

A grass collection bag for an electric rotary lawnmower having a swing-over handle wherein an electric power cord for supplying power to an electric motor means is releasably secured to the bag for preventing entanglement between the cord and bag.

BACKGROUND OF THE INVENTION

In recent years, electrically powered lawnmowers have become popular due to their ease in starting and nominal maintenance requirements. However, one detriment of electrically powered mowers utilizing an electric power cord is the fear on the part of some consumers that the cord might get into their way and might be destroyed if the lawnmower should accidentally pass over the cord.

Of the various types of mowers, rotary lawnmowers have been preferred by the public because of their simple, inexpensive design and their capacity for cutting. To facilitate the ease of operation of an electric rotary lawnmower, the handle is normally pivotally mounted to the housing so that the handle may be swung over whereby the user may reverse the direction of travel of the mower at the end of each cutting pass without the necessity of turning the mower around through 180°.

In many cases, the consumer desires to use a grass collection bag in connection with his rotary mower so that the severed grass clippings are not left on the lawn. It should be appreciated that if the lawnmower housing and cutter assembly are properly designed, the mower can be effectively used to pick up leaves from trees during the fall season. Naturally, if the lawnmower is used to pick up leaves even though the mower has the capability to pack the leaves, there is a need for a relatively large bag to hold the bulky volume of the rather light leaf material. When a large collection bag is employed with an electric rotary mower having a swing-over handle, there is a tendency for the power cord to become entangled with the grass bag and, in some instances, disengage the bag from the mower causing the dumping of clippings from the bag onto the lawn. Accordingly, there is a need for a collection bag and mower combination which eliminates the entangling problem between the power cord and bag.

SUMMARY OF THE INVENTION

The invention relates to a collection bag for an electric rotary lawnmower having an electric motor assembly mounted on a wheeled housing. The electric motor assembly includes a depending drive shaft which extends beneath the housing and on which a cutter is secured for rotation within the housing. The lawnmower housing is formed with a lateral discharge opening so that the grass or vegetation cut by the rotation of the cutter can easily discharge or egress through the discharge opening. Pivotally connected to the housing is a swing-over handle for guiding the lawnmower in either a forwardly or rearwardly direction. Providing power to the electric motor assembly is an electric power cord having one end connectable to a power source such as an electrical outlet and the other end in electrical connection with the electric motor assembly. An open end collection bag is releasably mounted to the housing in such a manner that the open end of the bag is in registry with the housing discharge opening whereby the debris or grass clippings emanating from the discharge opening are caught and stored in the collection bag. On the collection bag, there is provided a retaining means near the end remote from the bag open end for securing the electric power cord so that the cord not become entangled with the bag during the lawn cutting or leaf collecting operation.

Accordingly, it is an object of the present invention to provide an improved collection bag for an electric rotary lawnmower wherein the bag is provided with means for preventing the cord from becoming entangled with the bag.

It is a further object of the present invention to provide an improved collection bag for an electric rotary lawnmower wherein the power cord for the lawnmower is releasably secured to the grass bag at a point near the end of the bag remote from the lawnmower housing when the grass bag is attached thereto.

It is still a further object of the present invention to provide an electric rotary lawnmower having a swing-over handle and having an improved collection bag mountable to the lawnmower housing wherein means is provided on the grass bag for retaining the power cord in sliding relationship thereto for preventing the entanglement of the cord with the bag during the grass cutting or leaf collecting operation.

Further objects and advantages of the present invention will become apparent as the following description proceeds, and the features of novelty which characterize the invention will be pointed out with particularity in the claims annexed to and forming a part of this specification.

BRIEF DESCRIPTION OF THE DRAWING

For a better understanding of the present invention, reference may be had to the accompanying drawings in which.

DESCRIPTION OF THE PREFERRED EMBODIMENT

Figure 1:
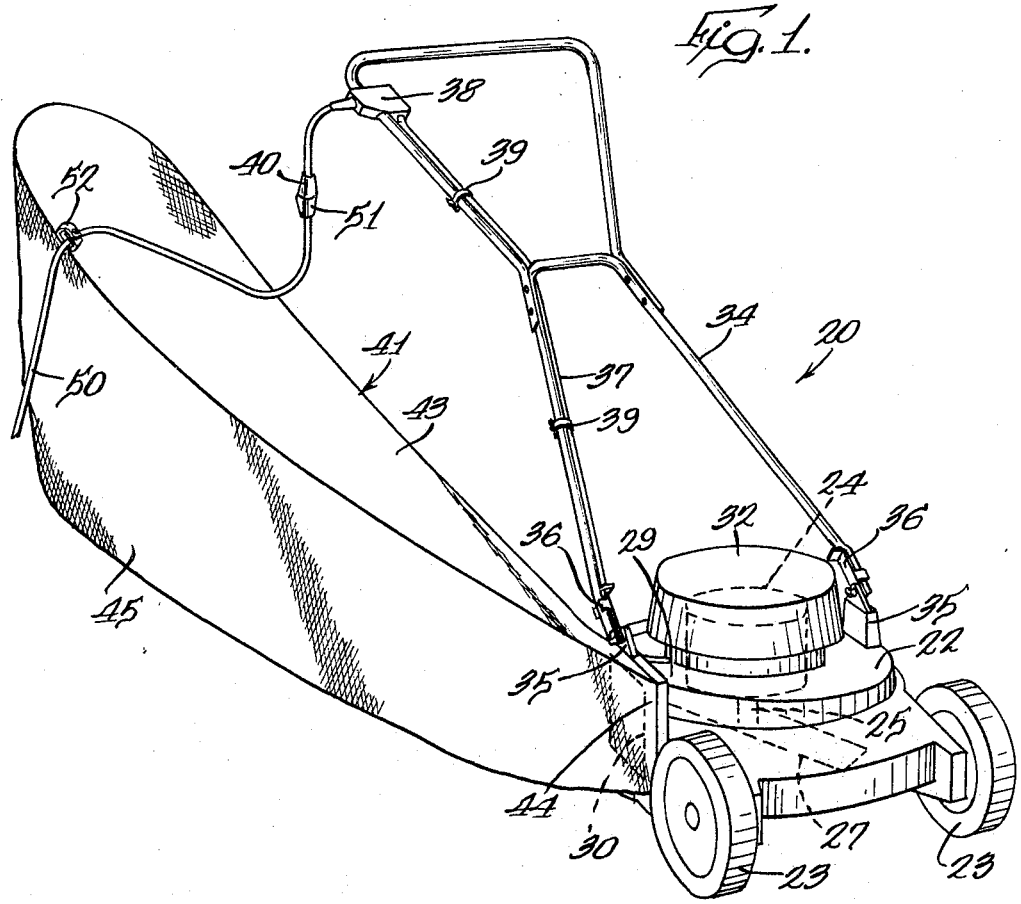
FIG. 1 is a perspective view of an electric rotary lawnmower having a grass collection bag mounted thereto embodying the present invention with a portion of the electric power cord removed.
Figure 2:
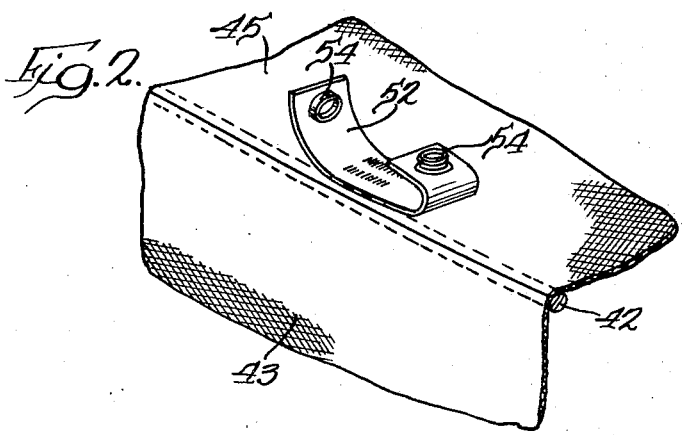
FIG. 2 is an enlarged fragmentary view of the portion of the grass collection bag containing the electric power cord retaining means in the open position.

Referring now to the drawings, there is illustrated an electrically operated rotary lawnmower referred to generally by the reference numeral 20. This lawnmower 20 is preferably manufactured in keeping with the lawnmower disclosed in copending application Ser. No. 562,-666, filed on July 5, 1966, and assigned to the same assignee as in this present application.

As may be seen in FIG. 1, the lawnmower 20 includes a cup-shaped housing 22 supported by a plurality of wheels 23 for movement on a lawn. Mounted on the housing 22 is an electric motor assembly 24 having a speed reducing gear section provided with an output shaft 25 extending downwardly beneath the housing 22. Securely attached to the output shaft 25 is a cutter 27 adapted for rotation within the housing 22 for severing vegetation or the like. Allowing the clippings to leave the mower in a controlled manner, the housing 22 is formed with a discharge chute 29 terminating at a discharge opening 30. Enclosing the electric motor assembly 24 is a motor shroud 32.

For the purpose of pushing the lawnmower housing 22 along the lawn and also for guiding it, there is provided a handle 34 which is pivotally mounted to housing projections 35 in such a manner that the handle may be swung to either the front or rear end of the lawnmower housing. With this construction, the handle is of the swing-over type whereby the user may use the handle when he is standing either at the front or the rear of the lawnmower. Thus, in cutting a lawn, the user does not need to turn the lawnmower around through approximately 180° at the end of each cutting pass but instead merely swings the handle over to the opposite end and pushes the lawnmower in the opposite direction. Consequently, a swing-over handle reduces the work imposed upon the user at the end of each cutting pass. As may be seen in FIG. 1, the lower end of the handle 34 includes a slidable latch 36 which limits the degree to which the handle may be swung downwardly at each end of the housing and also permits the user to lock the handle in a vertical storage position.

Electrically connected to the motor assembly 24 is a power cord 37 which passes through the side of motor shroud 32, extends along handle 34 and is connected to an on-off control switch 38. To keep the cord 37 in place, a plurality of spring clips 39 secure the cord to the handle 34. From the switch 38, the cord 37 extends loosely a short distance and terminates at a conventional plug 40. Since the cord 37 emerges from the motor shroud 32 at a point adjacent to the housing projection 35, the cord does not prevent or hinder the pivotal movement of the handle as it is swung from one end to the other.

In order for the user to collect the grass clippings or leaves egressing from the discharge opening 30, there is provided a removable grass collection bag assembly 41 including an internal rigid frame 42 and a porous pliable bag 43 having an open end 44 and an opposite remote end 45. Preferably, the frame 42 and the bag 43 are constructed as shown in detail in copending application Ser. No. 562,666 filed on July 5, 1966 and assigned to the same assignee as in this present application. The frame 42 is designed so that it may be easily attached and disengaged from the lawnmower housing 22 whereby the bag open end 44 is in register with the discharge opening 30 causing all of the grass clippings and severed vegetation to be propelled into the bag for storage. Preferably, the cutter 27 has fan or vane portions for pumping a considerable volume of air which carries the grass clippings into the bag assembly 41. Inasmuch as the bag 43 is relatively porous, the air pumped into the bag assembly 41 can easily pass through the bag 43 leaving the clippings trapped therein. To facilitate the removal of the clippings from the bag assembly 41, the bag 43 is preferably manufactured with a suitable zipper at the remote end 45. As may be seen in FIG. 1, the frame 42 supports the bag assembly 41 so that it extends laterally upwardly from the housing 22 and is angled with respect to the line of travel of the mower 20.

It should be appreciated that the grass collection bag assembly 41 is relatively large and has a considerable capacity for storing cut vegetation therein. In fact, the bag assembly 41 is sufficiently large so that it may be conveniently used if the lawnmower 20 is employed to collect leaves fallen from trees during the fall season of the year. That is to say, the bag assembly 41 has a sufficient volume to receive a relatively large quantity of leaves which have been somewhat compacted by the cutter 27. Furthermore, it should be realized that tree leaves during the fall season are relatively dry and, consequently, are rather light. Therefore, the bag assembly 41 can receive and store a large quantity of such leaves without materially affecting the center of gravity or balance of the lawnmower 20.

According to the present invention, a relatively long electric power or extension cord 50 has a conventional complementary plug 51 which is engageable with plug 40 whereby the power cord 50 is in electrical connection with the electric motor assembly 24. At the remote end of electric power cord 50 is a conventional plug (not shown) which can be attached to a suitable electric power source such as a conventional power outlet.

With the use of the relatively large bag assembly 41, the electric power cord 50 can easily become entangled therewith, particularly when it is realized that with a swing-over handle 34, the user does not wish to become involved with straightening out the power cord 50 at the end of each cutting pass.

For the purpose of preventing the power cord 50 from becoming entangled with the bag assembly 41, a retaining strap 52 is attached to the bag 43 at a position adjacent to the frame 42 and near the bag remote end 45. At this location, the strap 52 is disposed at an elevation above both the housing 22 and the electric motor assembly 24. Moreover, the strap 52 is disposed a considerable lateral distance from the housing 22 so that the attachment between the power cord 50 and the retaining strap 52 prevents the cord from getting in the way of the proper operation of the housing 22. The retaining strap 52 is preferably made from cloth material and is secured to the bag 41 by sewing or some other suitable means. Located at each end of retaining strap 52 is a conventional snap assembly 54 whereby the strap may be conveniently formed into a closed loop through which the power cord 50 can extend. Consequently, the power cord 50 may be easily removed from the retaining strap 52 by merely opening the snap assembly 54. Thus, when it is desired to empty the bag assembly 41, the power cord 50 is released from the retaining strap 52 by unsnapping the assembly 54. It should be noted that the power cord 50 is in sliding relationship with the strap 52 so that the cord may slide with respect to the strap 52 when the handle 34 is swung from one end of the mower to the other end. Since the cord 50 is positively attached near the remote bag end 45, the power cord cannot become entangled with the bag even though the direction of the mower is frequently reversed. With the bag assembly 41 disclosed in the drawing, it is particularly important that the power cord 50 does not become entangled therewith since the bag assembly 41 is pivotally attached to the housing 22 and may be disengaged therefrom by an upward pivotal movement. It follows, then, that the entanglement of the power cord with the bag assembly might cause the bag assembly to be disengaged from the lawnmower housing 22 so that the clippings or leaves therein might spew onto the lawn surface imposing additional and unnecessary work upon the user. With the arrangement shown herein, the power cord cannot become entangled with the bag assembly even though the direction of movement of the lawnmower is frequently changed and additionally, the cord is held laterally away from the lawnmower housing so that the cord will not lie in the path of the lawnmower, thus eliminating the problem of the lawnmower cutter accidentally severing the power cord 50 or doing considerable damage thereto.

As is evident from the above explanation, the present rotary lawnmower grass bag is provided with means for preventing the electric power cord from becoming entangled with the grass bag and also for controlling the movement of the power cord with respect to the mower. Moreover, the means for controlling the power cord in connection with the grass bag is inexpensively manufactured and easily securable to the bag assembly. It is intended in the appended claims to cover all changes and modifications as fall within the true spirit and scope of the present invention.

What is considered new and desired to be secured by Letters Patent of the United States is:

1. A grass bag for an electrical rotary lawnmower having an electric motor means mounted on an ambulatory housing, said electric motor means including a drive shaft extending beneath said housing and a cutter secured to said shaft for rotation within said housing, a lateral discharge opening defined by said housing so that grass cut by the rotation of said cutter can egress through said discharge opening, a swing-over handle pivotally connected to said housing and adapted for pushing the lawnmower in opposite directions, an electric power cord in electrical connection with said electric motor means for supplying power thereto, wherein the improvements comprising a collection bag having an open end releasably mountable to said housing so that said open end is in register with said housing discharge opening for catching and storing the grass egressing therethrough, retaining means on said bag near the end thereof remote from said bag open end for securing said electric power cord thereto thereby preventing the entanglement of said cord and bag.

2. The grass bag of claim 1 wherein said retaining means permitting the sliding movement of said power cord with respect thereto.

3. The grass bag of claim 2 wherein said retaining means including a strap attached to said bag and having releasable locking means at its ends for forming a closed loop through which said power cord is extendable.

4. The grass bag of claim 3 wherein said releasable locking means including a snap connector.

5. The grass bag of claim 1 wherein said collection bag including a rigid frame for supporting said retaining means laterally from said housing and for holding said bag open end in registry with said housing discharge.

6. The grass bag of claim 5 wherein said retaining means is disposed above both said housing and electric motor means.

7. An electric rotary lawnmower comprising a housing supported by wheel means, electric motor means secured to said housing and having a drive shaft extending beneath said housing, a cutter attached to said shaft for rotation within said housing, said housing forming a discharge opening through which grass cut by said cutter is expellable, a handle pivotally connected to said housing and adapted to swing over so that the mower can be guided in opposite directions, an electric power cord electrically connected to said motor means for supplying power thereto, an elongated removable grass bag provided with a rigid frame supporting it and having an open end and oppositely disposed closed end, said frame attachable to said housing so that said bag open end is in registry with said housing discharge end, retaining means on said bag nearer said closed end than said open end for holding said power cord whereby the reversing the direction of lawnmower movement does not entangle the said power cord with said bag.

8. The electric rotary lawnmower of claim 7 wherein said retaining means including a loop element through which said power cord passes so that said cord is in slidable relationship with said retaining means.

9. The electric rotary lawnmower of claim 8 wherein said loop element is readily openable for easily releasing said cord from said bag.

10. The electric rotary lawnmower of claim 7 wherein said housing is adapted for moving selectively forwardly and rearwardly, said grass bag extending laterally and upwardly from said housing, said retaining means disposed on said bag so that it is considerably above both said housing and electric motor means and to one side of said housing.

11. The electric rotary lawnmower of claim 10 wherein said handle is provided with an on-off control switch, electric cord means being electrically connectable with said electric motor means and said switch, said power cord being electrically engageable with said electric cord means at a point between said switch and said retaining means.

References Cited

UNITED STATES PATENTS

| | | | |
|---|---|---|---|
| 2,932,146 | 4/1960 | Campbell | 56—25.4 X |
| 3,028,717 | 4/1962 | West | 56—25.4 |
| 3,192,692 | 7/1965 | Slemmons | 56—25.4 |
| 3,213,600 | 10/1965 | Anderson | 56—202 |
| 2,775,087 | 12/1956 | Abel et al. | 56—25.4 |

F. BARRY SHAY, Primary Examiner

ROBERT F. CUTTING, Assistant Examiner

U.S. Cl. X.R.

15—83; 56—202